United States Patent [19]

Pearce

[11] Patent Number: 4,463,826
[45] Date of Patent: Aug. 7, 1984

[54] AIRPLANE TOW BAR AND STEP STOOL COMBINATION

[76] Inventor: Richard H. Pearce, 2127 S. Beaumont St., Moses Lake, Wash. 98837

[21] Appl. No.: 411,083

[22] Filed: Aug. 23, 1982

[51] Int. Cl.$^3$ ............................................... B60D 1/00
[52] U.S. Cl. ..................................... 182/20; 182/129; 280/491 R; 108/129
[58] Field of Search ..................... 182/20-26, 182/129, 152, 155, 16, 33; 280/491 R, 30, 493, 503, 493; 180/14 C; 108/129, 132, 130, 115

[56] References Cited

U.S. PATENT DOCUMENTS

| | | | |
|---|---|---|---|
| 476,897 | 6/1892 | Ripp | 182/22 |
| 1,912,947 | 6/1933 | Martin | 182/152 |
| 2,829,705 | 4/1958 | Godshalk | 182/20 |
| 3,554,318 | 1/1971 | Knight | 182/24 |
| 3,581,843 | 6/1971 | Hadley | 182/20 |
| 3,829,131 | 8/1974 | Moore | 280/493 |
| 3,895,828 | 7/1975 | Bitantis | 280/503 |
| 3,976,163 | 8/1976 | Watkinson | 182/20 |
| 4,046,221 | 9/1977 | Endfield | 182/155 |
| 4,121,788 | 10/1978 | McMahon | 180/14 C |
| 4,269,429 | 5/1981 | Eichstadt | 180/14 C |

*Primary Examiner*—Reinaldo P. Machado
*Assistant Examiner*—Alvin Chin-Shue
*Attorney, Agent, or Firm*—Harvey B. Jacobson

[57] ABSTRACT

Combination airplane tow bar, platform and step stool structure for use in attending to small aircraft. The platform includes an upper deck member having depending side flanges inset from each side edge thereof with each flange extending beyond the end edge of the deck member and terminating in a rounded apertured end. Leg assemblies are pivoted to the ends of the flanges for movement between a position perpendicular to the deck member for use of the device as a seat, step stool, elevated platform or the like and a position extending longitudinally outwardly of the deck member for use of the device as an airplane tow bar. One of the leg assemblies includes a latch structure for connection with an aircraft to enable the aircraft to be towed. The latch structure may include a spring latch depending on the aircraft attachment. Both leg assemblies can be pivoted into overlying relation to the deck member for compact storage and when folded, the device forms an effective wheel chock for the aircraft.

12 Claims, 6 Drawing Figures

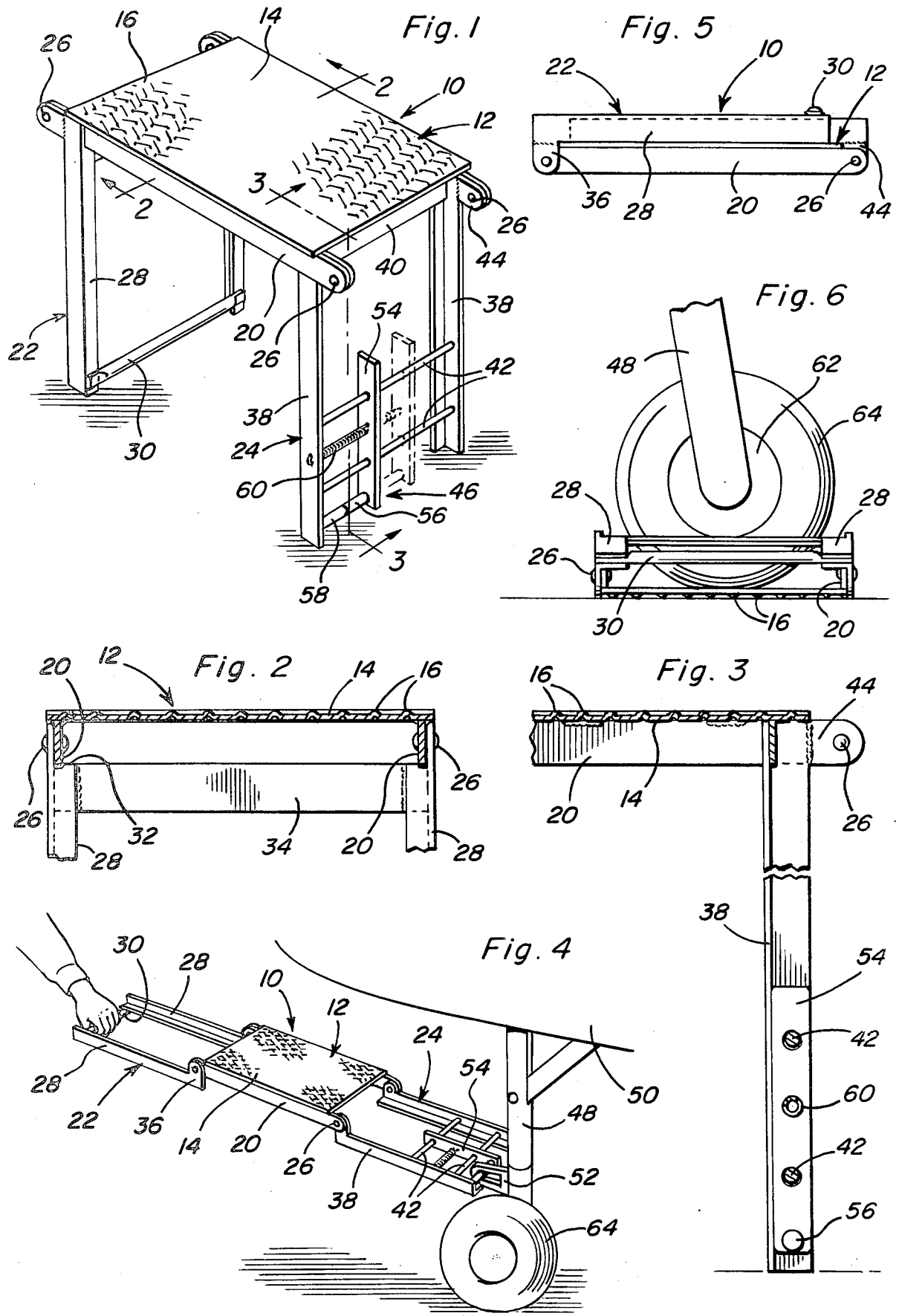

AIRPLANE TOW BAR AND STEP STOOL COMBINATION

BACKGROUND OF THE INVENTION

1. Field of the Invention

The present invention relates to a combination tow bar and platform structure for use in attending to small aircraft and in one mode provides a platform or stool for accessibility to portions of the aircraft and in a second mode, when the combination is in a generally distended and open arrangement, the combination is useful as a tow bar, and in a third mode, when folded, the platform cooperates with the flanges thereon to function as a wheel chock for the airplane.

2. Description of the Prior Art

Various combination structures have been provided for functioning as platforms, wheel chocks for airplanes, and other structures are known that have been provided as tow bars for small aircraft. Representative of this are the following U.S. patents that are exemplary of the art:

U.S. Pat. No. 2,829,705—Apr. 8, 1958—Godshalk,
U.S. Pat. No. 3,581,843—June 1, 1971—Hadley,
U.S. Pat. No. 3,829,131—Aug. 13, 1974—Moore,
U.S. Pat. No. 3,976,163—Aug. 24, 1976—Watkinson.

The patent to Hadley discloses an aircraft tow bar which is selectively foldable in a manner permitting the tow bar to be utilized as a ladder. The patents to Watkinson and Godshalk dislose foldable stands which are not utilizable as a tow bar in any way, while the patent to Moore discloses a construction of an aircraft tow bar which is not utilizable as a support stand or similar platform structure. None of these patents disclose all of the specific details of the present invention in such a way as to bear upon the patentability of any claim of the invention.

SUMMARY OF THE INVENTION

An object and advantage of the present invention is to provide a combination structure useful as a hand towing device for aircraft, also capable of serving as a platform device to stand on to provide a supporting surface at a sufficient height to allow a person to check aircraft fuel tanks, clean the windshield and otherwise attend to those preflight items on the aircraft that require extra height when a ladder is not available.

Another object and advantage of the present invention is to provide a combination device useful as a tow bar, a small stool or platform capable of being stored in the aircraft or about an airport which requires less space than a conventional separate tow bar and stool.

A further object of the present invention is to provide a structure of all metal construction having a platform surface allowing one to stand on at a sufficient height for access to elevated components of a small aircraft, capable of being used as a step stool or similar platform, useful as a tow bar, and, when fully closed and inverted, useful as a wheel chock.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing the combination tow bar and platform structure for use in attending to small aircraft positioned for use as a seat, step stool or elevated platform.

FIG. 2 is a sectional view taken along line 2—2 of FIG. 1.

FIG. 3 is a fragmental sectional view taken along line 3—3 of FIG. 1.

FIG. 4 is a perspective view of the device positioned for use as a tow bar engaged with the landing gear of an aircraft for hand towing.

FIG. 5 is a side elevational view showing the device folded forming a compact structure for storage.

FIG. 6 is an end elevational view of the device used as a wheel chock for an aircraft.

DESCRIPTION OF THE PREFERRED EMBODIMENT

Referring now to the drawings, there is shown a tow bar, step stool and portable chair combination 10 for use in attending to small aircraft including a platform 12 consisting of a generally rectangular flat plate 14 in the form of a metal deck member with anti-skid projections 16. The platform 12 includes depending flanges 20 spaced slightly inwardly from the opposite side edges with the flanges 20 extending beyond the opposite ends of the platform.

Leg assemblies 22 and 24 are pivotally connected to the extending ends of the flanges 20 for swinging movement about transverse axes parallel to but spaced outwardly from and slightly below the end edges of the platform 12 with the pivotal connection being formed by fasteners such as rivets, bolts or the like as designated by numeral 26. The leg assembly 22 includes a pair of parallel legs 28 interconnected adjacent their outer ends by a round bar 30 rigidly connected to the legs and spaced slightly from the outer ends thereof. The legs 28 are of angle iron configuration with the upper end of the inwardly extending flange being cut away to form a notch 32 which receives and abuttingly engages the lower edge portion of the flange 20 when the leg assembly 22 is perpendicular to the platform 12 as illustrated in FIGS. 1 and 2. The upper ends of the legs 28 are interconnected by a brace bar 34 having its upper edge coinciding with the shoulder formed by notch 32. The upper end of the outer flange of each leg 28 extends along the outer surface of the flange 20 and includes a pivot lug 36 extending alongside the extending ends of the flange 20 with the lugs 36 having rounded ends and pivotally connected to the ends of the flanges by the rivets 26.

The leg assembly 24 also includes a pair of parallel legs 38 of angle iron configuration with the upper ends being interconnected by a brace bar 40 secured to the inwardly extending flanges of the legs 38 with the upper edges of the brace bar 40 coinciding with the upper ends of the legs as shown in FIG. 3. The lower portions of the legs 38 are rigidly interconnected by a pair of parallel rods or bars 42 spaced longitudinally of the legs 38 with the lower rod 42 spaced from the lower ends of the legs 38. The upper end of each leg 38 is provided with a pivot lug 44 terminating in a rounded end and being pivotally connected to the ends of the flanges 20 by the rivets 26 with the legs 38 and lugs 44 being disposed along the inner surface of the flanges 20 thus eliminating the need for any notches in the legs 38. With this arrangement, both leg assemblies 22 and 24 can be stored by pivoting into overlying relation to the platform 12 and be nested within each other as illustrated in FIG. 5 for compact storage.

The leg assembly 24 includes a latch structure or connecting device 46 to connect the device to the landing gear such as a nose wheel strut 48 or other portion of an aircraft 50 which may be provided with an attachment in the form of an apertured lug 52 thereon. The latch structure 46 includes a sliding bar 54 extending between and slidably mounted on the rods 42 with the outer end of bar 54 extending beyond outer rod 42 but not extending beyond the outer ends of legs 38. The portion of the bar 54 beyond outer rod 42 is provided with a laterally extending stub shaft or short rod 56 parallel to and in spaced alignment with rods 42 and extending toward one of the legs 38. The leg 38 toward which short rod 56 projects is provided with a projecting stub shaft or short rod 58 aligned with short rod 56 for end to end abutting engagement when moved toward each other. A tension coil spring 60 interconnects the sliding bar 54 and the leg 38 which has the short rod 58 thereon and the spring 60 is disposed between the rods 42 to spring bias the short rods 56 and 58 toward each other and permit them to be moved apart for latching engagement with the aperture in the lug 52 on the airplane thus connecting the device to the airplane for use as a tow bar as illustrated in FIG. 4 in which the leg assemblies 22 and 24 are generally parallel to and form extensions of the platform 12 so that a person may grasp round bar 30 which serves as a handle when manually maneuvering the airplane or a towing vehicle is connected thereto. The spring 60 may not be necessary and the configuration of the latch structure may vary depending on the specific details of the aircraft attachment 52.

As illustrated in FIGS. 1-3, the pivot logs 36 and 44 are sufficiently long to position the legs 28 and 38 inwardly of the ends of the platform 12 with engagement of the upper ends of the legs 28 and 38 with the undersurface of the platform substantially inwardly of the pivotal axes serving to maintain the platform in stable position when used as a seat, step stool, elevated ace platform or the like with the legs perpendicular to the platform.

FIG. 4 illustrates the device oriented for use as a tow bar and FIG. 5 illustrates the device in folded position for storage aboard an aircraft, in a hangar or the like. Also, the device can serve as a chock for an aircraft wheel 62 when the flanges 20 are positioned upwardly and transversely of the periphery of the wheel and tire 64 thereon.

The foregoing is considered as illustrative only of the principles y of the invention. Further, since numerous modifications and changes will readily occur to those skilled in the art, it is not desired to limit the es invention to the exact construction and operation shown and described, and accordingly, all suitable modifications and equivalents may be resorted e to, falling within the scope of the invention. Accordingly, all suitable modifications and equivalents may be resorted to, falling within the scope of the invention.

What is claimed as new is as follows:

1. A combination airplane tow bar, seat, and step stool structure comprising a platform formed by a generally flat plate, a pair of leg assemblies, means pivotally connecting the leg assemblies to opposite peripheral portions of the platform for engagement of an upper end portion of each leg assembly with an undersurface of the platform when the leg assemblies are oriented in perpendicular depending relation to the platform so as to support the platform in elevated position for use as a seat or step stool, and for pivoting of the leg assemblies from said perpendicular relation to an overlying position to an upper surface of the platform to enable storage of the structure in a compact position, and means on one of said leg assemblies for connection with an airplane for use as a tow bar when the leg assemblies are pivoted to a position generally parallel to the platform and extending outwardly therefrom.

2. The structure as defined in claim 1 wherein each leg assembly includes a pair of parallel legs interconnected by parallel brace members to provide stable support for the platform.

3. The structure as defined in claim 1 wherein said plate is generally rectangular and provided with a depending flange along each side edge thereof and spaced slightly inwardly therefrom, each end of each flange extending beyond the end edge of the plate, each leg assembly having outwardly extending pivot lugs at the upper ends thereof in perpendicular relation to the leg assemblies and positioned along the ends of the flanges, means pivotally connecting the ends of the flanges and the pivot lugs to position the leg assemblies in engagement with the plate when the leg assemblies are perpendicular thereto.

4. The structure as defined in claim 3 wherein said means connecting the tow bar with the airplane includes a pair of inwardly extending members on one leg assembly, one of said members being movably supported and spring biased toward the other to enable the members to move apart to engage a portion of the aircraft and move back to an adjacent relation when released with the connecting means being varied to accomodate various types of aircraft.

5. The structure as defined in claim 4 wherein said inwardly extending members are in the form of short rods, one of said short rods being mounted on a slide bar slidably mounted on one of the leg assemblies, and a coil spring used when necessary to connect to the slide bar to bias the slide bar and short rod thereon toward the other short rod.

6. The structure as defined in claim 5 wherein each leg assembly includes a pair of parallel legs having said pivot lugs extending from the upper end thereof, a round brace member connecting the outer end portions of one pair of legs to rigidify the leg assembly and provide a handle when the device is used as a tow bar, the other pair of legs being interconnected by a pair of parallel spaced brace members, said slide bar being slidably mounted on said pair of brace members and being generally parallel to the legs, said spring, when used, interconnecting a portion of the slide bar intermediate the brace members and an adjacent leg.

7. The structure as defined in claim 6 wherein each of the legs are of right angular configuration, brace means interconnecting the upper ends of each pair of legs, one pair of legs having a notch in the upper end thereof to receive the depending flanges when the legs are in perpendicular relation thereto to enable the pivot lug on the upper end of each leg to be disposed along the outer surface of the flange to which it is pivotally connected.

8. A structure for use as an elevated support comprising a generally rectangular plate having an upper surface, an undersurface, side edges and end edges, a pair of depending parallel flanges on the undersurface of the plate adjacent the side edges thereof, a pair of legs depending from each end of the plate, each end of each flange and the upper end of each leg including a pivot lug extending outwardly beyond the end edges of the plates, means pivotally connecting the pivot lugs outwardly of the end edges of the plate thereby positioning the pivot axes outwardly of the plate and positioning the upper ends of the legs for engaging the undersurface of the plate inwardly of the end edges thereof when perpendicular thereto to form a stable support for the plate and enable folding of the legs into compact condition adjacent the upper surface of the plate.

9. The structure as defined in claim 8 wherein the pivot lugs on the legs at one end of the plate are disposed outwardly of the pivot lugs on the flange, the pivot lugs on the other pair of legs being inwardly of the pivot lugs on the flanges to enable the legs to pivot into overlying relation to the plate and disposed in nesting relation.

10. The structure as defined in claim 9 wherein said flanges having a width sufficient to serve as a wheel chock for an airplane wheel when inverted and positioned with the flanges perpendicular to the tire and wheel.

11. The structure as defined in claim 8 when wherein the legs and plate are dimensioned for use of the structure as a seat and step stool.

12. The structure as defined in claim 8 wherein the pair of legs at one end of the plate are provided with a connector means for releasably attaching the structure to an airplane wheel assembly and the pair of legs at the other end of the plate are connected by a cross member adapted to form a towing handle whereby the structure can be extended to form a tow bar for the airplane.

* * * * *